US012727632B2

(12) United States Patent
Han et al.

(10) Patent No.: US 12,727,632 B2
(45) Date of Patent: *Sep. 8, 2026

(54) SYSTEM AND METHOD FOR ABSORBING MOISTURE WITHIN A FACE MASK

(71) Applicant: HONEYWELL SAFETY PRODUCTS USA, INC., Charlotte, NC (US)

(72) Inventors: Charlie Han, Morris Plains, NJ (US); Kevin Lu, Morris Plains, NJ (US); Robin Xiang, Morris Plains, NJ (US); Jerry Shen, Morris Plains, NJ (US)

(73) Assignee: Honeywell Safety Products USA, Inc., Latham, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/324,722

(22) Filed: May 26, 2023

(65) Prior Publication Data

US 2023/0354931 A1 Nov. 9, 2023

Related U.S. Application Data

(62) Division of application No. 16/765,985, filed as application No. PCT/CN2017/112579 on Nov. 23, 2017, now Pat. No. 11,723,421.

(51) Int. Cl.
*A41D 13/11* (2006.01)
*A41D 31/10* (2019.01)
(Continued)

(52) U.S. Cl.
CPC .......... *A41D 13/1192* (2013.01); *A41D 31/10* (2019.02); *A41D 31/12* (2019.02);
(Continued)

(58) Field of Classification Search
CPC .... A41D 13/1192; A41D 31/10; A41D 31/12; A41D 31/305; A41D 13/11;
(Continued)

(56) References Cited

U.S. PATENT DOCUMENTS 4,920,960 A 5/1990 Hubbard et al.
6,062,220 A 5/2000 Whitaker et al.
(Continued)

FOREIGN PATENT DOCUMENTS

CN 201248380 Y 6/2009
CN 202941439 U 5/2013
(Continued)

OTHER PUBLICATIONS

EP Office Action Mailed on Jun. 12, 2023 for EP Application No. 17933142, 5 page(s).

(Continued)

*Primary Examiner* — Matthew D Matzek
(74) *Attorney, Agent, or Firm* — Fredrikson & Byron, P.A.

(57) ABSTRACT

Embodiments relate generally to systems and methods for absorbing moisture within a face mask worn by a user. A face mask may comprise at least one layer of filtration material configured to filter one or more harmful substances from the air breathed by a user; at least one layer of absorbent material configured to absorb moisture exhaled by the user, wherein the at least one layer of absorbent material spans the entire inner surface area of the mask; at least one layer of waterproof material located between the at least one layer of filtration material and the at least one layer of absorbent material configured to prevent moisture from the absorbent material from contacting the filtration material; and at least one layer of anti-bacterial material located
(Continued)

adjacent to the at least one layer of absorbent material and forming the inner surface of the mask.

12 Claims, 3 Drawing Sheets

(51) Int. Cl.
*A41D 31/12* (2019.01)
*A41D 31/30* (2019.01)
*A62B 23/02* (2006.01)
*B32B 5/02* (2006.01)
*B32B 5/26* (2006.01)

(52) U.S. Cl.
CPC .......... *A41D 31/305* (2019.02); *A62B 23/025* (2013.01); *B32B 5/022* (2013.01); *B32B 5/26* (2013.01); *A41D 2500/30* (2013.01); *B32B 2262/0253* (2013.01); *B32B 2262/0284* (2013.01); *B32B 2307/726* (2013.01); *B32B 2571/00* (2013.01)

(58) Field of Classification Search
CPC .. A41D 2500/30; A62B 23/025; B32B 5/022; B32B 5/26; B32B 2262/0253; B32B 2262/0284; B32B 2307/726; B32B 2571/00; B01D 2239/0225; B01D 2239/0442; B01D 2239/0618; B01D 2239/0627; B01D 2239/065; B01D 2239/10; B01D 39/163; B01D 39/1623
USPC ........ 128/206.1, 206.24, 863; 442/79, 85–90
See application file for complete search history.

(56) References Cited

U.S. PATENT DOCUMENTS

| | | | | |
|---|---|---|---|---|
| 6,759,357 | B1 * | 7/2004 | Toriumi | D04H 13/00 524/588 |
| 2004/0234760 | A1 * | 11/2004 | Hamed | D06M 14/04 428/375 |
| 2005/0079379 | A1 * | 4/2005 | Wadsworth | D04H 1/43838 428/684 |
| 2009/0041820 | A1 | 2/2009 | Wu et al. | |
| 2013/0096526 | A1 | 4/2013 | Schroder et al. | |
| 2017/0312558 | A1 * | 11/2017 | Wang | A62B 23/025 |

FOREIGN PATENT DOCUMENTS

| | | | |
|---|---|---|---|
| CN | 103519433 | A | 1/2014 |
| CN | 104106854 | A | 10/2014 |
| CN | 105401338 | A | 3/2016 |
| CN | 105996230 | A | 10/2016 |
| CN | 205682514 | U | 11/2016 |
| CN | 106465970 | A | 3/2017 |
| CN | 107072339 | A | 8/2017 |
| FR | 2473875 | A1 | 7/1981 |
| JP | 2015-123197 | A | 7/2015 |
| WO | 98/53896 | A1 | 12/1998 |
| WO | 2012/143464 | A1 | 10/2012 |
| WO | 2016/074219 | A1 | 5/2016 |
| WO | 2017/063137 | A1 | 4/2017 |
| WO | 2017/091920 | A1 | 6/2017 |

OTHER PUBLICATIONS

Examiner Interview Summary Record (PTOL-413) Mailed on Jun. 7, 2023 for U.S. Appl. No. 16/765,985, 2 page(s).
Notice of Allowance and Fees Due (PTOL-85) Mailed on Jun. 1, 2023 for U.S. Appl. No. 16/765,985, 4 page(s).
CN Office Action Mailed on Feb. 10, 2021for CN Application No. 201780042044.2, 17 page(s).
CN Office Action Mailed on Jul. 28, 2021for CN Application No. 201780042044.2.
CN Office Action Mailed on Jul 3, 2020for CN Application No. 201780042044.2, 18 page(s).
European search opinion Mailed on May 26, 2021 for EP Application No. 17933142, 4 page(s).
European Search Report Mailed on May 26, 2021for EP Application No. 17933142.6, 2 page(s).
International Search Report and Written Opinion mailed on Jun. 25, 2018 for WO Application No. PCT/CN17/112579.
Ma Jinwei et al. "Introduction to Nonwoven Fabric Technology", China Textile Press, 1st Ed. (2004), p. 83-84. Abstract provided as retrieved from the Internet at <URL: https://books-google-com.translate.goog/books/about/%E9%9D%9E%E7%BB%87%E9%80%A0%E5%B8%83%E6%8A%80%E6%9C%AF%E6%A6%82%E8%AE%BA.html?d=bvbVAAAACAAJ&_x_tr_sl=zh-CN&_x_tr_tl=en&_x_tr_hl=en&_x_tr_pto=nui,sc> on Nov. 1, 2021.
Non-Final Office Action Mailed on Aug. 10, 2022 for U.S. Appl. No. 16/765,985.
Notice of Allowance and Fees Due (PTOL-85) Mailed on Feb. 28, 2023 for U.S. Appl. No. 16/765,985.
Requirement for Restriction/Election Mailed on May 26, 2022 for U.S. Appl. No. 16/765,985.
Supplementary European search report Mailed on May 26, 2021 for EP Application No. 17933142, 2 page(s).
Notice of Allowance and Fees Due (PTOL-85) Mailed on Jun. 30, 2023 for U.S. Appl. No. 16/765,985, 2 page(s).
Notification of Oral Proceeding Mailed on Jul. 2, 2024 for EP Application No. 17933142, 6 page(s).
Communication about intention to grant a European patent Mailed on Dec. 3, 2024 for EP Application No. 17933142, 6 page(s).
Decision to grant a European patent Mailed on Apr. 10, 2025 for EP Application No. 17933142, 3 page(s).
European Patent Office, "Extended European Search Report" , From Application No. 25174631.9, Dated Feb. 3, 2026, pp. 10.

* cited by examiner

SYSTEM AND METHOD FOR ABSORBING MOISTURE WITHIN A FACE MASK

CROSS REFERENCE TO RELATED APPLICATIONS

This application is a divisional of U.S. application Ser. No. 16/765,598, filed May 21, 2020, which is a National Stage Application, filed under 35 U.S.C. § 371, of International Application No. PCT/CN2017/112579, filed Nov. 23, 2017, the contents of each of which are hereby incorporated by reference in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Dust masks, and other face masks, may be worn in various situations, such as in city environments where the ambient air could be dangerous to the user, or work environments, where the user may be exposed to dangerous particles in the air. Masks may be worn over the user's nose and mouth to ensure that the user does not inhale hazardous materials. In some cases, face masks may comprise exhalation valves.

SUMMARY

In an embodiment, a face mask may comprise at least one layer of filtration material configured to filter one or more harmful substances from the air breathed by a user; at least one layer of absorbent material configured to absorb moisture exhaled by the user, wherein the at least one layer of absorbent material spans the entire inner surface area of the mask; wherein the mask is configured to allow air to pass through the filtration material and the absorbent material; and wherein the absorbent material comprises super absorbent fibers.

In an embodiment, a method of absorbing moisture exhaled by a user within a face mask may comprise allowing airflow to pass through a plurality of layers of the face mask toward the face of the user; filtering one or more harmful substances from the airflow via at least one layer of filtration material; allowing the airflow to pass through at least one layer of absorbent material, wherein the at least one layer of absorbent material spans the entire inner surface area of the mask; allowing exhaled air from the user to pass through the at least one layer of absorbent material; and absorbing moisture from the exhaled air by the at least one layer of absorbent material.

In an embodiment, a face mask may comprise at least one layer of filtration material configured to filter one or more harmful substances from the air breathed by a user; at least one layer of absorbent material configured to absorb moisture exhaled by the user, wherein the at least one layer of absorbent material spans the entire inner surface area of the mask; at least one layer of waterproof material located between the at least one layer of filtration material and the at least one layer of absorbent material configured to prevent moisture from the absorbent material from contacting the filtration material; and at least one layer of anti-bacterial material located adjacent to the at least one layer of absorbent material and forming the inner surface of the mask.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
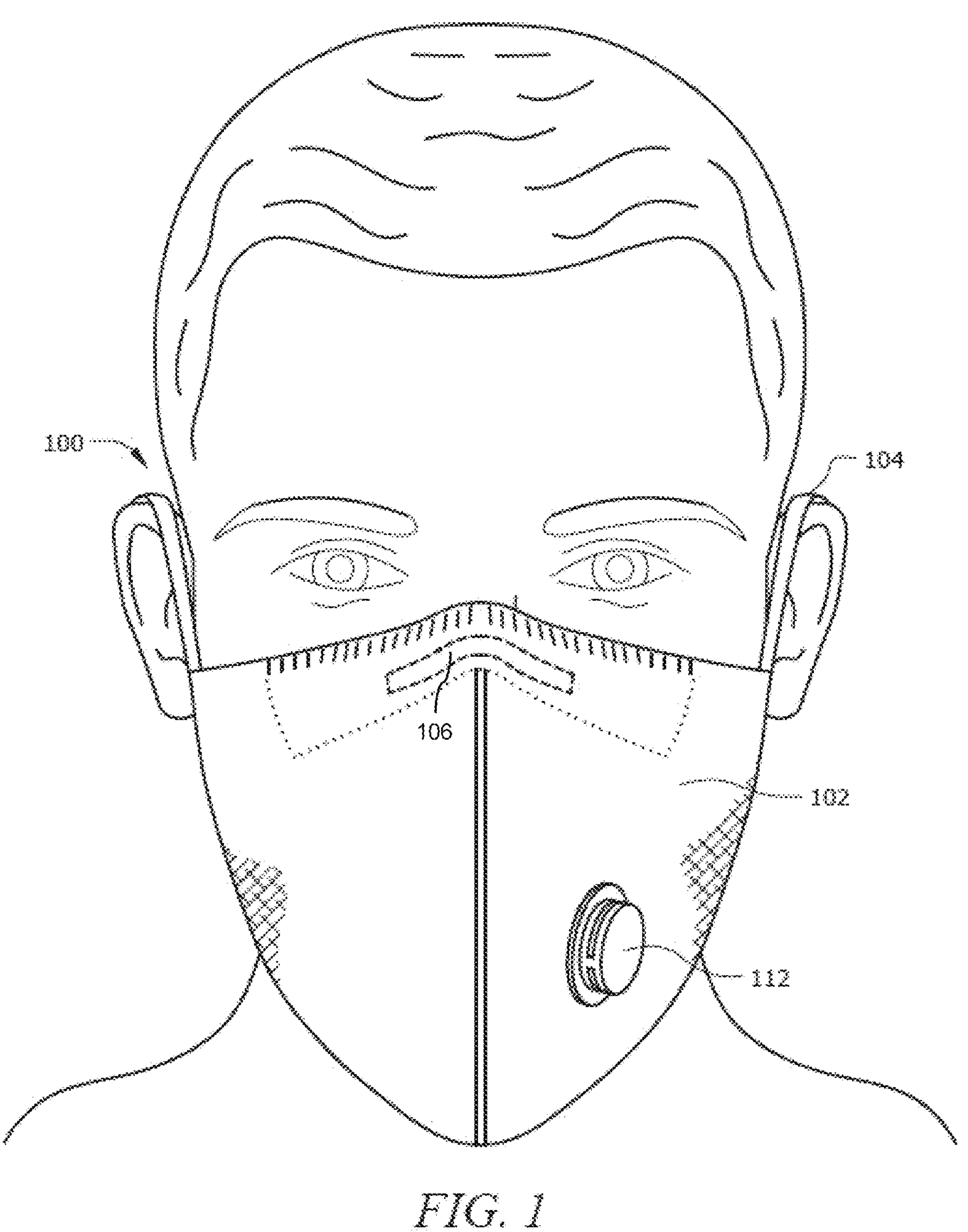
FIG. 1 illustrates a front view of a face mask worn by a user according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

- The term "comprising" means including but not limited to, and should be interpreted in the manner it is typically used in the patent context;
- The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);
- If the specification describes something as "exemplary" or an "example," it should be understood that refers to a non-exclusive example;
- The terms "about" or "approximately" or the like, when used with a number, may mean that specific number, or alternatively, a range in proximity to the specific number, as understood by persons of skill in the art field; and
- If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for preventing discomfort for a user wearing a face mask. Dust masks, and other masks that filter harmful substances, may be worn by a variety of users. Air pollution is a serious problem in some countries, such as China, especially in the winter. People may wear respirators or masks when outside for protection. The use of a moisture absorbing material may extend the life of a face mask. If a user is uncomfortable when wearing the mask, the user may discard the mask before it has been exhausted, thus wasting some of the lifetime of the mask. Additionally, users may be more likely to wear a mask, and thus protect themselves from harmful ambient air, if the mask is comfortable. When the moisture is not removed from the mask, the moisture may build up in the filtering material of the mask, increasing the breathing resistance through the material. Additionally, bacteria thrive in warm and damp environments, so a damp mask could contain harmful bacteria. Also, if a user wears glasses, humidity from a mask may mist the user's glasses, reducing visibility. Additionally, water condensation (or moisture build-up) within the mask can allow for bacteria growth in the mask.

Embodiments of the disclosure include a face mask comprising a plurality of layers, wherein at least one layer is an absorbent layer configured to absorb moisture exhaled by the user. The mask may also comprise one or more filtration layers configured to filter harmful substances from the air. In the embodiments disclosed herein, the airflow into the mask may pass through both the filtration layer(s) and the absorbent layer(s). In some embodiments, the absorbent layer may span the entire inner surface area of the mask.

The absorbent layer may comprise a super absorbent fiber (SAF) material. The super absorbent fiber material may have a strong moisture retention capability, and is able to lock the water in the material without rewetting. Therefore, this super absorbent fiber material may keep the inner layer of the mask contacting the user's skin dry, thus increasing the user's wearing comfort.

Referring now to FIG. 1, an embodiment of a face mask 100 is shown as worn by a user, wherein the face mask 100 may comprise a nonwoven fabric material 102 and one or more straps 104 configured to hold the mask 100 against the face of a wearer. In the embodiment shown, the mask 100 comprises a flat foldable shape, wherein the mask may be folded flat and unfolded to fit over the face of a user. In other embodiments, the mask 100 may comprise a molded cup shape. In some embodiments, the mask 100 may comprise an exhalation valve 112 configured to allow air exhaled by the user to exit the mask 100 while preventing external air from entering the mask 100 via the exhalation valve 112. In some embodiments, the mask 100 may comprise a nose clip 106 configured to secure the mask 100 about the nose of a user.

Figure 2:
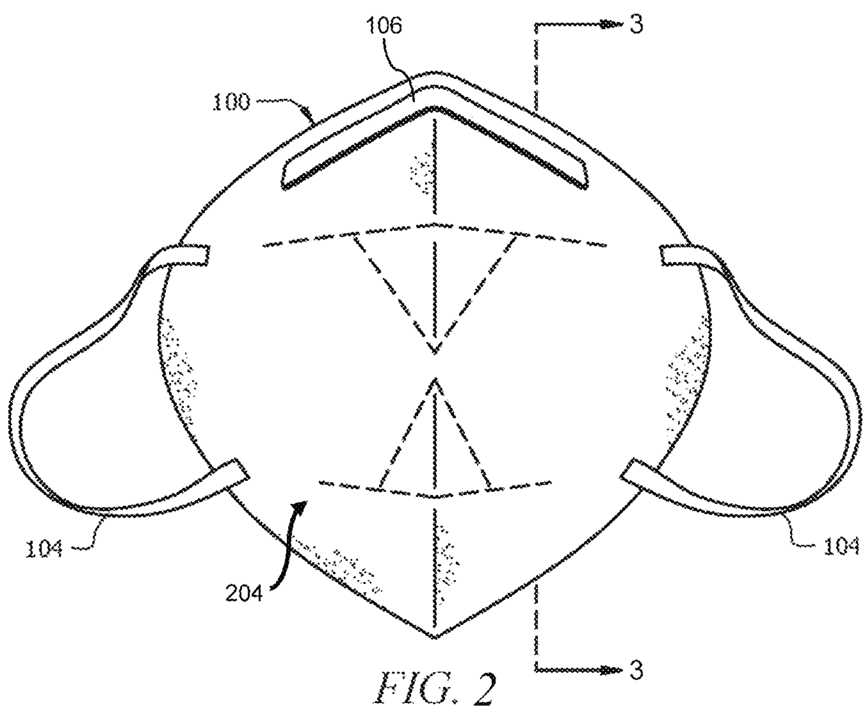
FIG. 2 illustrates another view of a face mask, not worn by a user according to an embodiment of the disclosure.

FIG. 2 illustrates another view of the mask 100 (not worn by the user), showing the exterior surface 204 of the mask 100.

Figure 3:
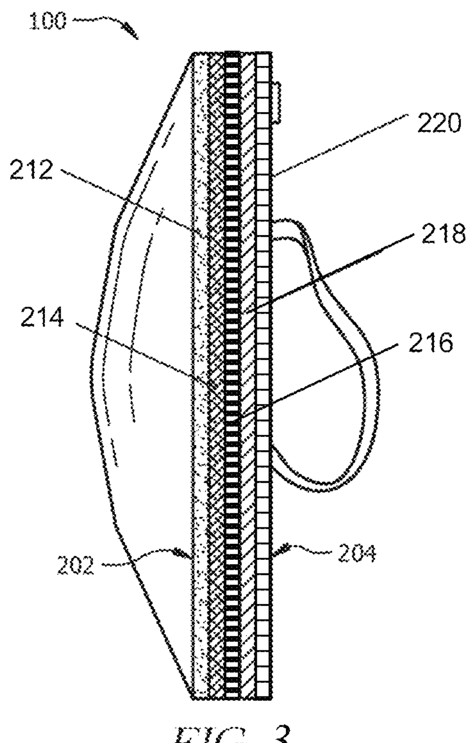
FIG. 3 illustrates a cross-sectional view of the face mask of FIG. 2 according to an embodiment of the disclosure.

FIG. 3 illustrates a cross-section of the mask of FIG. 2 (as indicated in FIG. 2). The cross-sectional view shows the inner surface 202 of the mask (configured to contact and/or be located proximate to the face of the user, and outer surface of the mask 204, with the curvature of the rest of the mask as well as other elements shown "behind" the cross-section. In some embodiments, the nonwoven fabric material 102 of the mask 100 may comprise a plurality of layers. As an example, the mask 100 may comprise a first layer 212 forming an interior surface 202 of the mask 100. In some embodiments, the first layer 212 may be configured to contact the face of the user. In some embodiments, the first layer 212 may comprise an anti-bacterial material. The mask 100 may comprise a second layer 214 located adjacent to the first layer 212. In some embodiments, the second layer 214 may comprise an absorbent layer configured to absorb moisture exhaled by a user.

The mask may comprise a third layer 216 located adjacent to the second layer 214. In some embodiments, the third layer 216 may comprise a waterproof material configured to prevent moisture from the second layer 214 from contacting a fourth layer 218. The mask may comprise a fourth layer 218 located adjacent to the third layer 216. In some embodiments, the fourth layer 218 may comprise a filtration material configured to trap and/or filter one or more harmful substances from the airflow into the mask 100. The mask may comprise a fifth layer 220 located adjacent to the fourth layer 218, which may form the exterior surface 204 of the mask 100. In some embodiments, the fifth layer 220 may comprise a protective cover configured to protect the filtration material of the fourth layer 218 from damage. In some embodiments, the fifth layer 220 may comprise a hydrophobic material configured to prevent moisture from the environment from passing through the fifth layer 220 into the mask 100. This hydrophobic material may also ensure that moisture absorbed by the second layer 214 of the absorbent material is only coming from one direction (e.g. from the interior of the mask).

In alternative embodiments, the layers may be in a different order, wherein the order of the layers of material may not change the filtration abilities of the different layers. In some embodiments, additional layers of filtration material may be added to the mask 100.

The plurality of layers 212, 214, 216, 218, and 220 may be formed using a variety of methods of forming nonwoven materials. For example, the materials of the layers may comprise one or mare of melt-blown nonwoven materials, spunlaid (or spunbond) nonwoven materials, and/or spunlace nonwoven materials. The materials of the layers may be formed and/or combined with one another using techniques known to those of skill in the art. As an example, the materials of the layers may be formed and/or combined with one another using one or more of melt-blown techniques, spunlaid techniques, needle punching (or needle felting), through-air bonding, adhesive bonding, thermal bonding, hydro-entanglement (i.e. spunlace techniques), ultrasonic pattern bonding, and/or chemical bonding.

The formation of the layers may allow airflow through the layers of the nonwoven fabric material 102 to the user, while also providing filtration and/or absorption functionality. For example, the fibers of the absorbent material of the second layer 214 may be formed such that air may flow through the fibers of the second layer 214, even when moisture has been absorbed by the fibers of the second layer 214.

As a specific example, the first layer 212 may comprise a spunlace anti-bacterial material. As a specific example, the second layer 214 may comprise an absorbent material formed using needle punching and/or through-air bonding. As a specific example, the third layer 216 may comprise a spunbond waterproof material. As a specific example, the fourth layer 218 may comprise a melt-blown filtration material. As a specific example, the fifth layer 220 may comprise a spunbond nonwoven material. The use of these layers in this combination and configuration may provide improved comfort to the user without compromising the filtration properties of the mask and without significantly increasing the breathing resistance of the mask.

As described above, the third layer 216 (of waterproof material) may be located between the second layer 214 (of absorbent material) and the fourth layer 218 (of filtration material). The third layer 216 may be configured to prevent any moisture absorbed by the second layer 214 from contacting the filtration material of the fourth layer 218, thereby preventing any possible damage to the filtration material.

The absorbent layer 214 may comprise super absorbent fibers (SAF) combined with polyethylene terephthalate (PET) fibers, ethylene-propylene side-by-side (ES) fibers, and/or a low melting point fiber (LMF). The details of the ingredients of the absorbent material of the second layer 214 are outlined in Table 1. Specifically, in some embodiments, the super absorbent fibers may comprise sodium polyacrylate fibers.

TABLE 1

Ingredients of super absorbent material

| Ingredients | Material | Proportion % | Function |
|---|---|---|---|
| SAF | Super absorbent fiber | 30~40 | Water Absorption |
| PET | Polyethylene Terephthalate | 40~50 | Support material |
| ES | Ethylene-Propylene Side-by-Side | 10~20 | Improve Seal Process of Dust Mask |
| LMF | Low Melting Point Fiber | 10~20 | |

When compared to typical cotton or spunlace materials, the absorbent material as described above may comprise a higher water absorptive capacity (as defined by the China National Standard for Textiles GB/T 24218.6). For example, the water absorptive capacity of the absorbent material described above may be approximately 4500%, while a typical cotton or spunlace material may only have a water absorptive capacity of approximately 400-600%.

Figure 4:
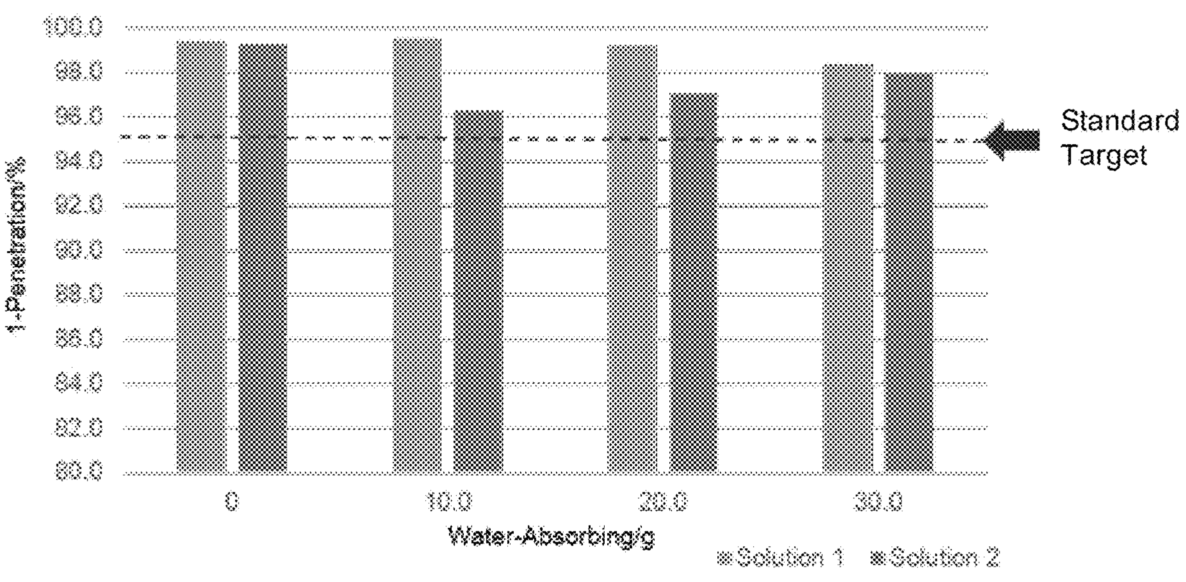
FIG. 4 illustrates the results of testing the filtration capabilities of two masks according to an embodiment of the disclosure.

FIG. 4 illustrates the determined filtration efficiency of a first mask (Solution 1) and a second mask (Solution 2), both comprising an absorbent layer as described above. In the embodiment shown, the first mask may be formed using through-air bonding, while the second mask may be formed using needle punching. The standard target for filtration efficiency (measured in %) may be approximately 95%. As shown in FIG. 4, the first mask and the second mask were determined to have filtration efficiencies higher than the 95% target at increasing levels of water absorption ranging from approximately 0 grams (g) to approximately 30 g of water absorbed by the mask.

Figure 5:
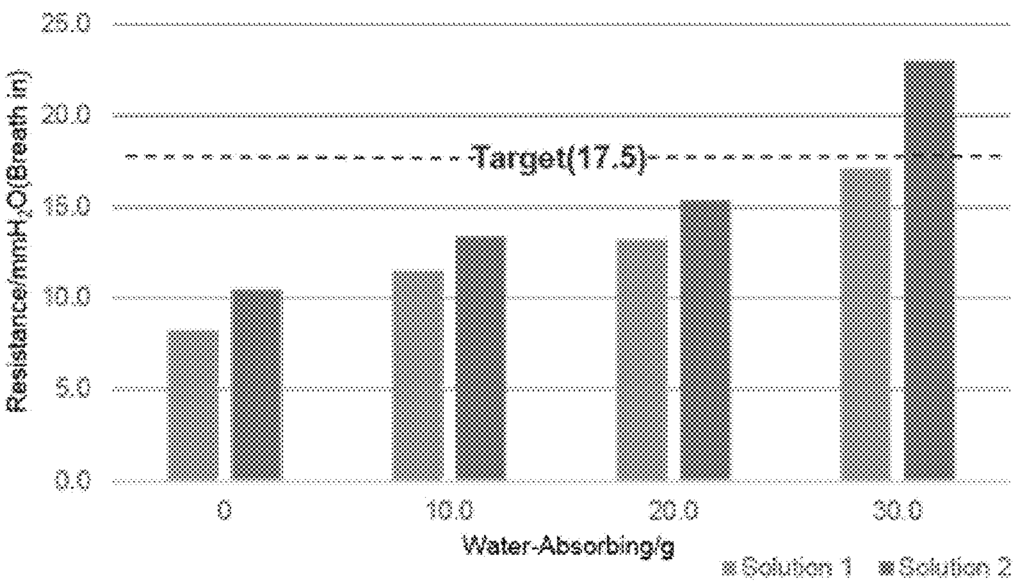
FIG. 5 illustrates the results of testing the breathing resistance of two masks according to an embodiment of the disclosure.

FIG. 5 illustrates the determined airflow (or breathing) resistance of the first mask (Solution 1) and the second mask (Solution 2), both comprising the absorbent layer as described above. The graph of FIG. 5 illustrates the measure breathing resistance in $mmH_2O$ at different levels of water absorption ranging from approximately 0 g to approximately 30 g (of water absorbed by the mask). The target maximum breathing resistance may be approximately 17.5 $mmH_2O$. As shown in FIG. 5, while the breathing resistance may increase as more water is absorbed by the mask, the breathing resistance remained below the target maximum except for one example of the second mask (Solution 2) with 30 g of absorbed water.

The test results shown in FIGS. 4 and 5 illustrate that the mask comprising the absorbent material can effectively absorb moisture without negatively impacting the filtration properties of the mask and/or significantly increasing the breathing resistance of the mask.

Additional testing was completed on a mask comprising the configuration of layers described above. Testing was completed at lower temperature (approximately 0-5° C.), where users wore a traditional mask and a mask comprising the configuration of layers described herein for approximately 1.5 hours in the low temperature environment. After breathing while wearing the masks for the defined time period, the inner surfaces of the masks were observed to check for moisture condensation. The traditional mask (without the absorbent material and/or the described configuration) was observed to have a significant amount of moisture located on the inner surface of the mask. The mask comprising the configuration described herein was observed to have no moisture located on the inner surface of the mask.

Additionally, the moisture absorption capability of the mask comprising the absorbent material (as described herein) while used in lower temperatures (approximately 0-5° C.) is shown in Table 2 below. The dust mask comprising the absorbent material may be able to absorb moisture with weight gain of approximately 0.3-0.4 g from a user's exhaled breath during approximately 0.5-1 hour in the low temperature environment (e.g., at 0° C. and at 5° C.).

TABLE 2

Moisture absorption capability of mask with absorbent material

| Sample | 5° C. | | | | 0° C. | | |
|---|---|---|---|---|---|---|---|
| | 0 hr | 0.5 hr | 1 hr | Change | 0 hr | 0.5 hr | Change |
| 1 | 5.61 g | 5.85 g | 5.99 g | 0.38 g | 5.99 g | 6.31 g | 0.32 g |
| 2 | 6 g | 6.27 g | 6.37 g | 0.37 g | 6.09 g | 6.44 g | 0.35 g |
| 3 | 5.8 g | 6.06 g | 6.14 g | 0.34 g | 6.17 g | 6.55 g | 0.38 g |
| Average | 5.80 g | 6.06 g | 6.17 g | 0.36 g | 6.08 g | 6.43 g | 0.35 g |

Embodiments may also include a method of absorbing moisture within a face mask while the user is wearing the mask. The plurality of layers of the mask may enable a variety of functions. A method may include allowing airflow to pass through the plurality of layers of the mask from the external environment toward the face of the user. This airflow may pass through all layers (including a layer of absorbent material) before reaching the user. A method may comprise filtering one or more harmful substances from the airflow by at least one layer of filtration material. A method may comprise allowing exhaled air from the user to pass through the at least one layer of absorbent material, and absorbing moisture from the exhaled air by the at least one layer of absorbent material. The method may further comprise, after absorbing moisture from the exhaled air, continuing to allow airflow through the plurality of layers (including the absorbent material) from the external environment toward the face of the user.

A method may further comprise preventing generation of bacteria within the mask by at least one layer of anti-bacterial material, wherein the anti-bacterial material forms and inner surface of the mask. A method may further comprise preventing moisture from the absorbent material from contacting the filtration material by at least one layer of waterproof material located between the absorbent material and the filtration material. A method may further comprise preventing moisture from the external environment from entering the mask by at least one outer layer of the mask.

Having described various devices and methods herein, exemplary embodiments or aspects can include, but are not limited to:

In a first embodiment, a face mask may comprise at least one layer of filtration material configured to filter one or more harmful substances from the air breathed by a user; at least one layer of absorbent material configured to absorb moisture exhaled by the user, wherein the at least one layer of absorbent material spans the entire inner surface area of the mask; wherein the mask is configured to allow air to pass through the filtration material and the absorbent material; and wherein the absorbent material comprises super absorbent fibers.

A second embodiment can include the face mask of the first embodiment, further comprising at least one layer of waterproof material located between the at least one layer of filtration material and the at least one layer of absorbent material configured to prevent moisture from the absorbent material from contacting the filtration material.

A third embodiment can include the face mask of the second embodiment, wherein the at least one layer of waterproof material comprises a spunbond waterproof material.

A fourth embodiment can include the face mask of any of the first through third embodiments, further comprising at least one layer of anti-bacterial material located adjacent to the at least one layer of absorbent material and forming the inner surface of the mask.

A fifth embodiment can include the face mask of the fourth embodiment, wherein the at least one layer of anti-bacterial material comprises a spunlace anti-bacterial material.

A sixth embodiment can include the face mask of any of the first through fifth embodiments, further comprising at least one outer layer comprising a hydrophobic material located adjacent to the filtration material and configured to protect the filtration material and prevent moisture from entering the material of the mask from the exterior of the mask.

A seventh embodiment can include the face mask of the sixth embodiment, wherein the at least one outer layer comprises a spunbond nonwoven material.

An eighth embodiment can include the face mask of any of the first through seventh embodiments, further comprising an exhalation valve configured to allow exhaled breath from the user to exit the mask.

A ninth embodiment can include the face mask of any of the first through eighth embodiments, wherein the absorbent material further comprises polyethylene terephthalate, ethylene-propylene side-by-side fiber, and/or a low melting point fiber.

A tenth embodiment can include the face mask of the ninth embodiment, wherein the fibers of the absorbent material are configured to be combined to form a layer of the mask via needle punching.

An eleventh embodiment can include the face mask of the ninth or tenth embodiments, wherein the fibers of the absorbent material are configured to be combined to form a layer of the mask via through-air bonding.

In a twelfth embodiment, a method of absorbing moisture exhaled by a user within a face mask may comprise allowing airflow to pass through a plurality of layers of the face mask toward the face of the user; filtering one or more harmful substances from the airflow via at least one layer of filtration material; allowing the airflow to pass through at least one layer of absorbent material, wherein the at least one layer of absorbent material spans the entire inner surface area of the mask; allowing exhaled air from the user to pass through the at least one layer of absorbent material; and absorbing moisture from the exhaled air by the at least one layer of absorbent material.

A thirteenth embodiment can include the method of the twelfth embodiment, further comprising preventing generation of bacteria within the mask by at least one layer of anti-bacterial material, wherein the anti-bacterial material forms an inner surface of the mask.

A fourteenth embodiment can include the method of the twelfth or thirteenth embodiments, further comprising preventing moisture from the absorbent material from contacting the filtration material by at least one layer of waterproof material located between the absorbent material and the filtration material.

A fifteenth embodiment can include the method of any of the twelfth through fourteenth embodiments, further comprising preventing moisture from the external environment from entering the mask by at least one outer layer of the mask.

In a sixteenth embodiment, a face mask may comprise at least one layer of filtration material configured to filter one or more harmful substances from the air breathed by a user; at least one layer of absorbent material configured to absorb moisture exhaled by the user, wherein the at least one layer of absorbent material spans the entire inner surface area of the mask; at least one layer of waterproof material located between the at least one layer of filtration material and the at least one layer of absorbent material configured to prevent moisture from the absorbent material from contacting the filtration material; and at least one layer of anti-bacterial material located adjacent to the at least one layer of absorbent material and forming the inner surface of the mask.

A seventeenth embodiment can include the face mask of the sixteenth embodiment, wherein the airflow into the mask passes through the filtration material and the absorbent material.

An eighteenth embodiment can include the face mask of the sixteenth or seventeenth embodiments, further comprising at least one outer layer comprising a hydrophobic material located adjacent to the filtration material and configured to protect the filtration material and prevent moisture from entering the material of the mask from the exterior of the mask.

A nineteenth embodiment can include the face mask of any of the sixteenth through eighteenth embodiments, wherein the absorbent material comprises one or more of a super absorbent fiber, polyethylene terephthalate, an ethylene-propylene side-by-side fiber, and a low melting point fiber.

A twentieth embodiment can include the face mask of any of the sixteenth through nineteenth embodiments, wherein the fibers of the absorbent material are combined to form a layer of the mask using one of needle punching or through-air bonding.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A face mask comprising:

at least one layer of filtration material configured to filter one or more harmful substances from air breathed by a user;

at least one layer of absorbent material configured to absorb moisture exhaled by the user, and at least one layer of waterproof material configured to prevent moisture from the absorbent material from contacting the filtration material, wherein:

the at least one layer of absorbent material and the at least one layer of waterproof material each span an entire inner surface area of the face mask;

the face mask is configured to allow air to pass through the filtration material and the absorbent material; and the at least one layer of absorbent material comprises super absorbent fibers combined with one or more of polyethylene terephthalate fibers and ethylene-propylene side-by-side fibers wherein the super absorbent fibers are configured to combined to form a layer of the face mask via through air-bonding.

2. The face mask of claim 1, further comprising at least one layer of waterproof material located between the at least one layer of filtration material and the at least one layer of absorbent material configured to prevent moisture from the absorbent material from contacting the filtration material.

3. The face mask of claim 2, wherein the at least one layer of waterproof material comprises a spunbond waterproof material.

4. The face mask of claim 1, further comprising at least one outer layer comprising a hydrophobic material located adjacent to the filtration material and configured to protect the filtration material and prevent moisture from entering the hydrophobic material of the face mask from exterior of the face mask.

5. The face mask of claim 4, wherein the at least one outer layer comprises a spunbond nonwoven material.

6. The face mask of claim 1, further comprising an exhalation valve configured to allow exhaled breath from the user to exit the face mask.

7. A face mask comprising:

at least one layer of filtration material configured to filter one or more harmful substances from air breathed by a user;

at least one layer of absorbent material configured to absorb moisture exhaled by the user; and at least one layer of waterproof material configured to prevent moisture from the absorbent material from contacting the filtration material, wherein:

the at least one layer of absorbent material and the at least one layer of waterproof material each span an entire inner surface area of the face mask;

the face mask is configured to allow air to pass through the filtration material and the absorbent material; and the at least one layer of absorbent material comprises super absorbent fibers combined with one or more of polyethylene terephthalate fibers and ethylene-propylene side-by-side fibers wherein the super absorbent fibers are configured to combined to form a layer of the face mask via through needle punching.

8. The face mask of claim 7, further comprising at least one layer of waterproof material located between the at least one layer of filtration material and the at least one layer of absorbent material configured to prevent moisture from the absorbent material from contacting the filtration material.

9. The face mask of claim 8, wherein the at least one layer of waterproof material comprises a spunbond waterproof material.

10. The face mask of claim 7, further comprising at least one outer layer comprising a hydrophobic material located adjacent to the filtration material and configured to protect the filtration material and prevent moisture from entering the hydrophobic material of the face mask from exterior of the face mask.

11. The face mask of claim 10, wherein the at least one outer layer comprises a spunbond nonwoven material.

12. The face mask of claim 7, further comprising an exhalation valve configured to allow exhaled breath from the user to exit the face mask.

* * * * *